(12) United States Patent
Yang et al.

(10) Patent No.: US 7,317,825 B2
(45) Date of Patent: Jan. 8, 2008

(54) USING TEMPORAL AND SPATIAL COHERENCE TO ACCELERATE MAXIMUM/MINIMUM INTENSITY PROJECTION

(75) Inventors: Lining Yang, East Windsor, NJ (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 404 days.

(21) Appl. No.: 11/176,532

(22) Filed: Jul. 7, 2005

(65) Prior Publication Data
US 2006/0147106 A1    Jul. 6, 2006

Related U.S. Application Data

(60) Provisional application No. 60/638,230, filed on Dec. 22, 2004.

(51) Int. Cl.
G06K 9/00        (2006.01)
(52) U.S. Cl. .................. 382/154; 345/420; 345/424; 345/426
(58) Field of Classification Search ............ 382/274, 382/154; 345/424, 426, 420
See application file for complete search history.

(56) References Cited

U.S. PATENT DOCUMENTS 6,597,359 B1 *  7/2003  Lathrop ..................... 345/440

2005/0286748 A1 * 12/2005  Yang et al. ................. 382/128
2006/0274065 A1 * 12/2006  Buyanovskiy .............. 345/424
2007/0040833 A1 *  2/2007  Buyanovski ................ 345/426
2007/0053553 A1 *  3/2007  Gerritsen et al. ........... 382/128

OTHER PUBLICATIONS

Ray et al., "Ray Casting Architectures for Volume Visualization," Sep. 1999, IEEE Transactions on Visualization & Computer Graphics, vol. 5, No. 3, pp. 211-213.*
Jung et al., "An Analytical Ray Casting of Volume Data," Oct. 1998, Pacific Graphics '98 Sixth Pacific Conference on Computer Graphics and Applications, pp. 79-86.*
Wallis et al., "Three-Dimensional Display in Nuclear Medicine," Dec. 1989, IEEE Transactions on Medical Imaging, vol. 8, No. 4, pp. 297-303.*

* cited by examiner

Primary Examiner—Samir Ahmed
Assistant Examiner—Stephen R Koziol (57) ABSTRACT

A computer-implemented method for intensity projection includes providing volume data, determining an estimated threshold for determining a maximum/minimum intensity value in the volume data from temporal coherence and spatial coherence information, performing the second pass for determining an actual maximum/minimum value along the new ray, wherein the second pass uses the estimated threshold as an initial threshold, and updating the buffer with a new location value where the actual maximum/minimum value for the next frame was determined.

14 Claims, 7 Drawing Sheets

USING TEMPORAL AND SPATIAL COHERENCE TO ACCELERATE MAXIMUM/MINIMUM INTENSITY PROJECTION

This application claims priority to U.S. Provisional Application Ser. No. 60/638,230, filed on Dec. 22, 2004, which is herein incorporated by reference in its entirety.

BACKGROUND OF THE INVENTION

1. Technical Field

The present invention relates to volume rendering, and more particularly to a system and method for maximum/minimum intensity projection.

2. Discussion of Related Art

Maximum Intensity Projection (MIP) is a widely accepted volume rendering technique that is used to extract high-intensity structure from volumetric scalar data. At each pixel the highest sample value encountered along the corresponding viewing ray is determined. MIP is commonly used to extract vascular structure from medical CT or MRI data sets, for example, angiography. MIP exploits the fact, that within angiography data sets the data values of vascular structures are higher than the values of the surrounding tissue. By depicting the maximum data value seen through each pixel, the structure of the vessels contained in the data is captured.

Similarly, the volume rendering technique called Minimum Intensity Projection (MinIP) is used to extract low-intensity structures from volumetric scalar data. At each pixel the lowest data value encountered along the corresponding viewing ray is determined. MinIP is often used for lungs and airways studies. MIP and MinIP are opposite methods from algorithms point of view. By reversing the maximum and minimum theses algorithms are mirror symmetric.

Ray casting based MIP is intrinsically expensive since the rays must go through and tri-linearly interpolate all the samples along them to find the maximal values. The commonly used acceleration techniques for direct volume rendering of raycast such as space leaping and early ray termination can not be used for MIP.

Therefore, a need exists for a system and method for MIP/MinIP having improved speed characteristics.

SUMMARY OF THE INVENTION

According to an embodiment of the present disclosure, a computer-implemented method for intensity projection includes providing volume data, creating a buffer to storing in the buffer, for each ray of previous frame, a first distance from a pixel to a maximum/minimum intensity value along a corresponding ray, storing in the buffer, for each ray of the previous frame, the following frame from the pixel, the ray having a first location retrieved from the buffer, wherein the first location is determined according to the first distance, determining, for the pixel, an estimated maximum/minimum intensity of at least one sample around the first location as an initial threshold for a second pass, performing the second pass for determining an actual maximum/minimum value along the new ray, and updating the buffer with a new location value where the actual maximum/minimum value for the next frame was determined.

The method further includes storing in the buffer, for each ray of current frame, a second distance from a pixel to a maximum/minimum intensity value along a corresponding ray, storing in the buffer, for each ray of the current frame, the maximum/minimum intensity values, casting a new ray from a neighboring pixel, the pixel having a second location retrieved from the buffer, wherein the second location is determined according to the second distance, and determining, for the pixel, the estimated maximum/minimum intensity value of the at least one sample along the ray as the initial threshold for the second pass, wherein the maximum/minimum intensity is selected from the first location and the second location.

According to an embodiment of the present disclosure, a computer-implemented method casting a ray through an image includes providing a reduced path octree structure of a volumetric image, said reduced path octree comprising a plurality of first level nodes, wherein each first level node contains a plurality of intensities, wherein each node includes a minimum intensity value and a maximum intensity value, defining a position determined as a maximum/minimum along a ray in a previous frame as an estimated threshold for a current frame, and visiting each first level node along the ray, wherein a maximum/minimum intensity value for the first level nodes is selected by the threshold, sampling each intensity within each first level node, and saving a maximum/minimum value of each said sample.

According to an embodiment of the present disclosure, a computer implemented method casting a ray through an image includes providing a reduced path octree structure of a volumetric image, said reduced path octree comprising a plurality of first level nodes, wherein each first level node contains a plurality of intensities, wherein each node includes a minimum intensity value and a maximum intensity value, defining a position determined as a maximum/minimum along a neighboring ray as an estimated threshold for a current frame, and visiting each first level node along the ray, wherein a maximum/minimum intensity value for the first level nodes is selected by the threshold, sampling each intensity within each first level node, and saving a maximum/minimum value of each said sample.

According to an embodiment of the present disclosure, a computer-implemented method for intensity projection includes providing volume data, determining an estimated threshold for determining a maximum/minimum intensity value in the volume data from temporal coherence and spatial coherence information, performing the second pass for determining an actual maximum/minimum value along the new ray, wherein the second pass uses the estimated threshold as an initial threshold, and updating the buffer with a new location value where the actual maximum/minimum value for the next frame was determined.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

By reversing the maximum and minimum, methods presented herein are mirror symmetric. Therefore, methods described for MIP can also be applied to MinIP. For simplicity, only methods for determining MIP are described in detail.

According to an embodiment of the present disclosure, a searching method utilizes coherence information. The coherence information can be obtained in a neighboring ray (spatial coherence) or in a previous frame (temporal coherence) to obtain an initial threshold. The threshold can further accelerate a MIP method.

To reduce MIP overhead and obtain a threshold, both the temporal coherence and the spatial coherence are used to estimate the initial threshold.

The location and the value of the maximum intensity along a ray typically does not change much from frame to frame as long as a change in the viewing angle is small, e.g., about 5 degrees. According to an embodiment of the present disclosure, a method for determining a MIP threshold utilizes the property of frame-to-frame coherence to get the initial threshold.

Figure 1:
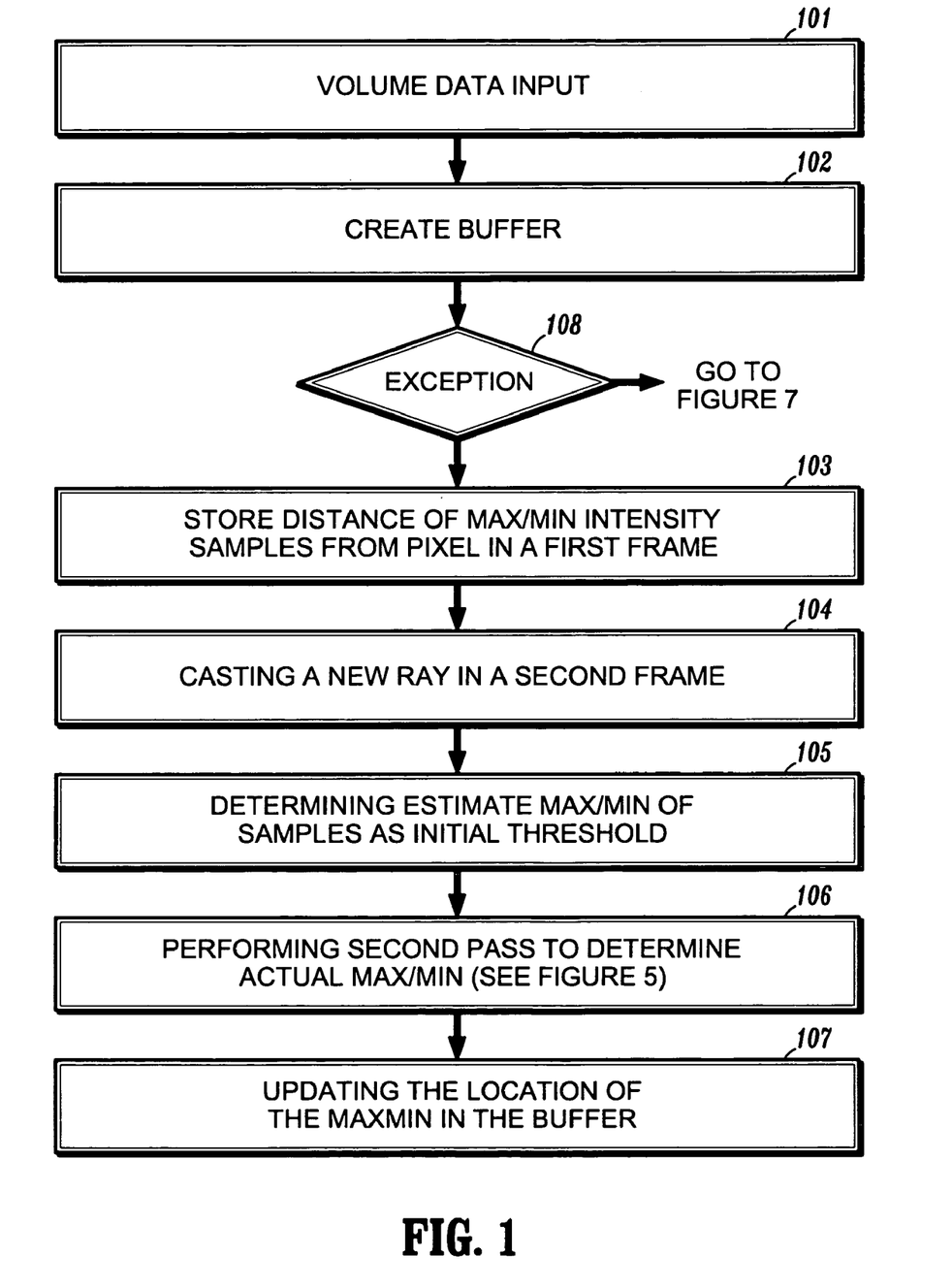
FIG. 1 is a two-pass method for peak information having an improved first pass according to an embodiment of the present disclosure.

Referring to FIG. 1, a buffer called maxMipLoc is created 101 to store the location information for each ray and to use the information for the following frame. The buffer maxMipLoc has a same size as the rendering image. For each ray the distance from the pixel to the maximum intensity sample along the ray is stored in the buffer at an entry where the ray originates 102. In the following frame a new ray is cast from the same pixel position at a new viewing angle 103. The location value for this ray is retrieved from the buffer maxMipLoc and used to determine samples around the same location 104. The maximum of the samples is then used as the initial threshold for a second pass 105. A second pass searches for an actual maximum value along the ray 106. The second pass is described in "SYSTEM AND METHOD FOR FAST GENERATION OF HIGH-QUALITY MAXIMUM/MINIMUM INTENSITY PROJECTIONS" U.S. patent application Ser. No. 11/159004 filed May 22, 2005.

Figure 4:
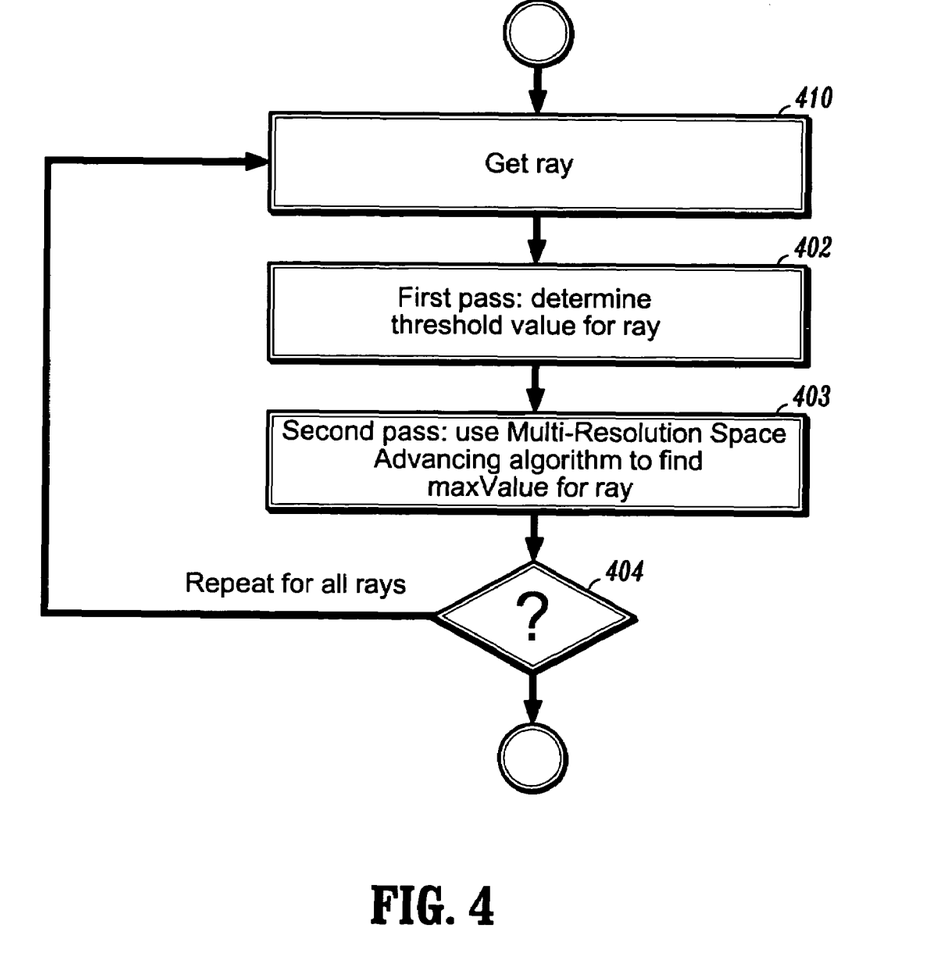
FIG. 4 is a flow chart of a two-pass method.

A Min-Max Reduced path Octree method as described in "SYSTEM AND METHOD FOR FAST GENERATION OF HIGH-QUALITY MAXIMUM/MINIMUM INTENSITY PROJECTIONS" includes two passes for each ray. FIG. 4 depicts a flowchart of an exemplary Min-Max Reduced path Octree method according to an embodiment of the invention. An exemplary Min-Max Reduced path Octree method includes two passes for each ray. A first ray is selected at block 401. At block 402, a first pass through the ray finds an initial threshold. The first pass according to an embodiment of the present disclosure is described herein (see example, see FIG. 1). The second pass, at block 403, uses a Multi-Resolution Space Advancing algorithm to assist a fast marching along the ray. The second pass can skip empty space that it excludes by thethreshold. With an appropriate threshold, few nodes are selected by the threshold and are sampled with tri-linear interpolations. Those nodes selected by the threshold are sampled by the ray, and a sample extreme value is saved as the rendering value for each ray. If a MIP is being performed, nodes whose intensity exceeds the threshold are sampled, and the sample maximum is saved. If a MinIP is being performed, nodes whose intensity is less than the threshold are sampled, and the sample minimum is saved. At block 404, the next ray is selected, and blocks 403 and 404 are repeated until all rays have been cast.

Figure 6:
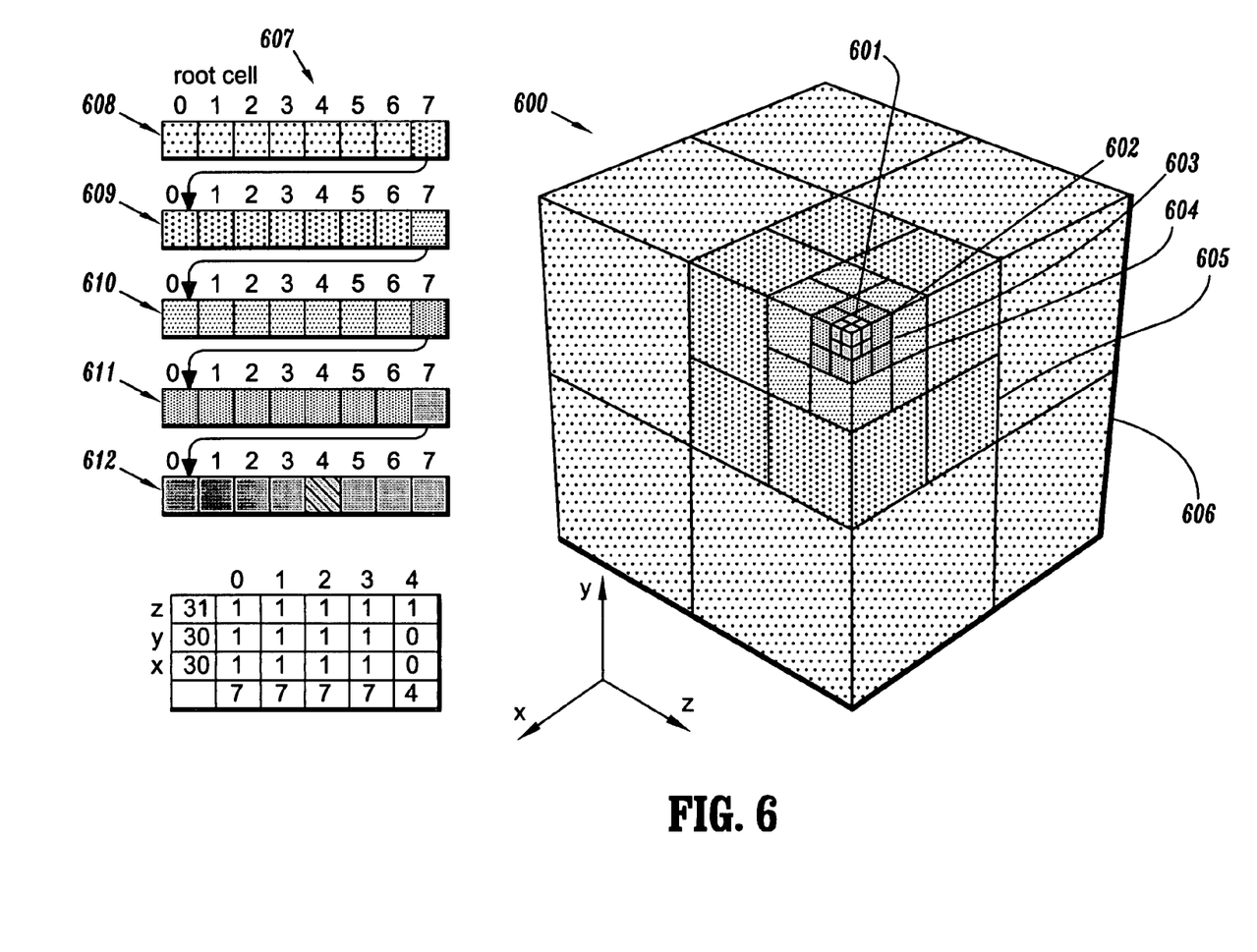
FIG. 6 is a diagram of an octree according to an embodiment of the present disclosure.

For the purpose of clarity, and without loss of generality, a Min-Max Reduced Path Octree structure that includes two levels, 4%4%4 and 16%16%16, will be described. A non-limiting example of an octree is depicted in FIG. 6. A dataset 609 is shown schematically in the figure. The dataset depicted in the figure comprises 32%32%32 voxels 601. Each group of 8 adjacent voxels 601 that form a 2%2%2 cube are grouped into a first level node 602. Each group of 8 adjacent first level nodes 602 that form a 2%2%2 cube of first level nodes are grouped into a second level node 603. Each group of 8 adjacent second level nodes 603 that form a 2%2%2 cube of second level nodes are grouped into a third level node 604. Similarly, each group of 8 adjacent third level nodes 604 that form a 2%2%2 cube of third level nodes are grouped into a fourth level node 605. The 8 adjacent fourth level nodes 605 form a 2%2%2 cube are grouped into a fifth level node 606. This fifth level node, being a top level for this dataset, forms the root node.

The left side of FIG. 6 represents how nodes in a given level of the octree refer to nodes in the next lower level. Five rows 607 are illustrated, one row for each level in the octree. Row 608 illustrates the 8 cells of the fifth level node 606, numbered from 0 to 7, and so forth for 608-613. Although each cell in row 608 points to 8 lower level nodes, for the sake of clarity in the drawing,the this is depicted only for cell 7 in the diagram. Cell 7 of row 608 is shown pointing to the first of 8 fourth level nodes in row 609. Similarly, each cell in row 609 points to 8 lower level nodes, and this is indicated by cell 7 of row 609 pointing to the first of 8 third level nodes 610. Cell 7 of row 610 is shown pointing to the first of 8 second level nodes 611, and cell 7 of row 611 is shownpointing to 8 first level nodes 612. In this manner, a method can traverse from the root node 15 through each lower level node until reaching individual voxels 601.

The use of these 4%4%4 and 16%16%16 nodes is exemplary and non-limiting, and it is to be understood that different sized nodes can be used and be within the scope of an embodiment of the invention. In addition, it is to be understood that a Reduced Path Octree structure can include more than two levels and still be within the scope of an embodiment of the present disclosure. In a reduced path octree, the number if intermediate layers have been reduced. Associated with each node at each level is a minimum and maximum value of all the nodes/voxels contained within the node. Reducing the number of intermediate layers reduces the additional memory needed by the data structure, and reduces the complexity of the indexing. Each layer can be treated as a sub-sampled volume and the indexing relationship between different layers for the corresponding nodes is implicit with no additional needed pointers. For example, considering a 512%512%512-cube dataset and a voxel with the (x, y, z) position being (240, 36, 410), the corresponding node location in the 4%4%4 layer is (60, 9, 103) and the corresponding node location in the 16%16%16 layer is (15, 3, 26). Note that the division by 4 with rounding can be efficiently computed via right shifting by two bits. More generally, if the size of the dataset itself and the sizes of the nodes comprising the octree are all powers of two, then the conversion of an upper level index to a lower level index can by accomplished by right shifting the upper level index by an appropriate number of bits.

Figure 5:
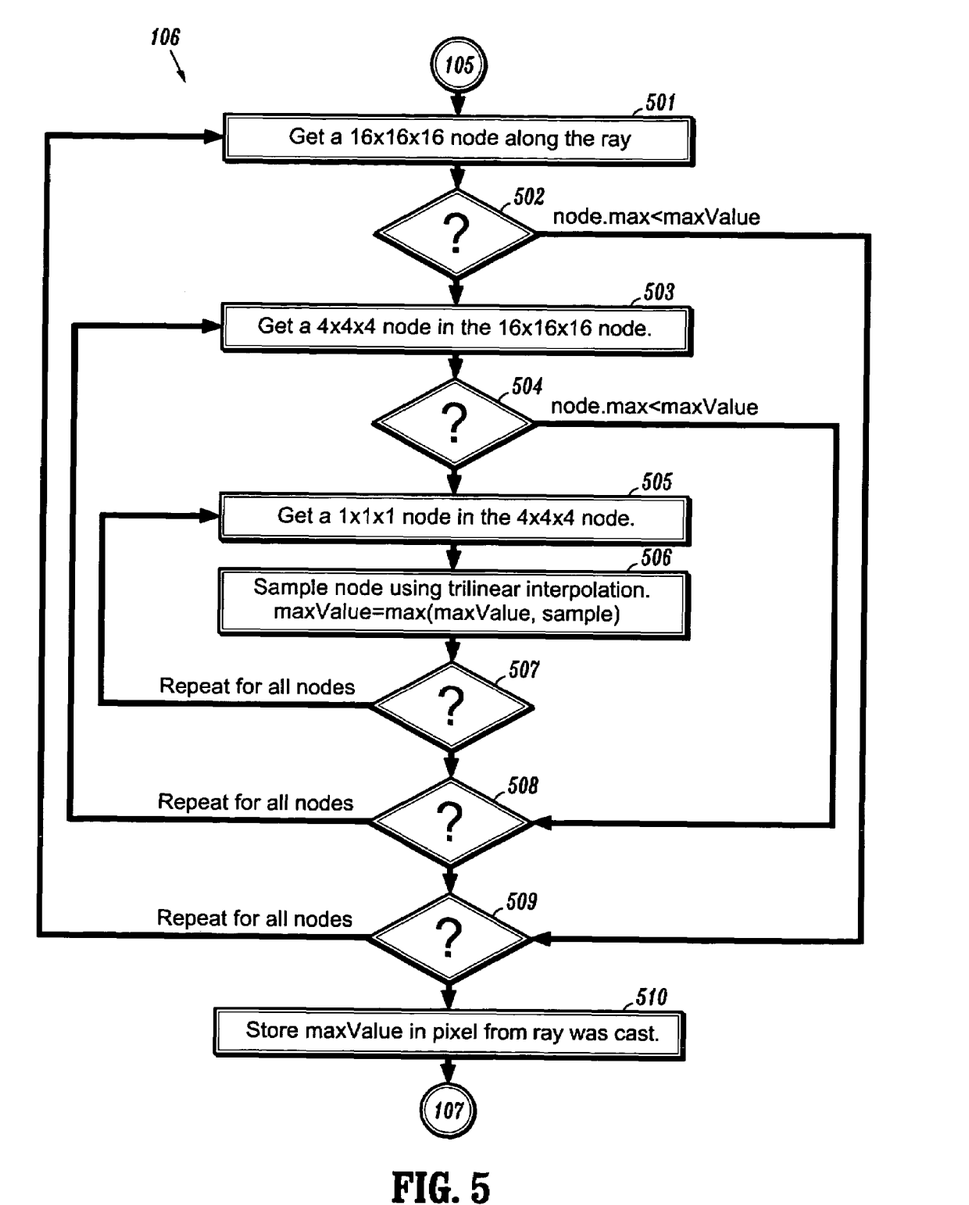
FIG. 5 is a flow chart of a second pass.

FIG. 5 depicts a flow chart of a second pass of MIP method according to an embodiment of the present disclosure. The second pass used the maxValue as an initial threshold in a Reduced Path Octree. In a non-limiting example described herein, a Min-Max Reduced Path Octree structure that includes two levels, 4%4%4 % and 16%16%16 node along the ray at block 501. If, at block 502, the maximum of this 16%16%16 node is less than the threshold, the node is considered to be empty and can be skipped. The process jumps to block 509 to advance to the next 16%16%16 node. If the 16%16%16 node is not empty, them a first level lower node, such as the 4%4%4 level nodes within the parent 16%16%16 node, is visited at block 503, and the step size is reduced to four. If a block 504, the maximum of this 4%4%4 node is less than the threshold, the node is considered to be empty and can be skipped. The process jumps to block 508 to advance to the next 4%4%4 node. If the 4%4%4 node is not empty, then a next level lower node, such as the 1%1%1 level nodes within the parent 4%4%4 node, is visited at step block 505, and the step size is reduced to one. At block 506, the node is sampled using tri-linear interpolation, and a maximum value of the samples and the threshold is determined. If the sample is smaller than the threshold, the sample value is discarded, otherwise maxValue is replaced with the new sample value. At block 507, the next 1%1%1 node is visited until all 1%1%1 nodes in the 4%4%4 node have been visited. The step size is now increased back to four and the next 4%4%4 node is visited at block 508, and the preceding block 504-507 are repeated. After all the 4%4%4 nodes within the specific 16%16%16 node are processed, the step size is increased to sixteen and the next 16%16%16 node is visited at block 509. The preceding blocks 502-508 are repeated for all 16%16%16 nodes along the ray, and the final maxValue is stored at block 510 in the pixel from which the ray was cast.

Thus, for each Octree node that the ray passes through, the maximum value of the node is checked against the initial threshold. If it is less than the threshold, the node is skipped and no voxels in the node are sampled (interpolated) (see FIG. 5). Referring again to FIG. 1, after determining the maximum value, the maxMipLoc buffer is updated with the new location value where the maximum value for the next frame was determined 107.

The location and the value of the maximum intensity of a ray are typically close to that of a neighboring ray. This spatial coherence is exploited to simplify the initial threshold estimate. For each ray the distance information is used from the neighboring ray that is cast just before it.

Ray casting is a process that, for each pixel in an image volume to be rendered, casts a single ray from the eye through the center of the pixel and into the volume, integrating optical properties, such a opacity, obtained from the encountered volume densities along the ray path.

Figure 3:
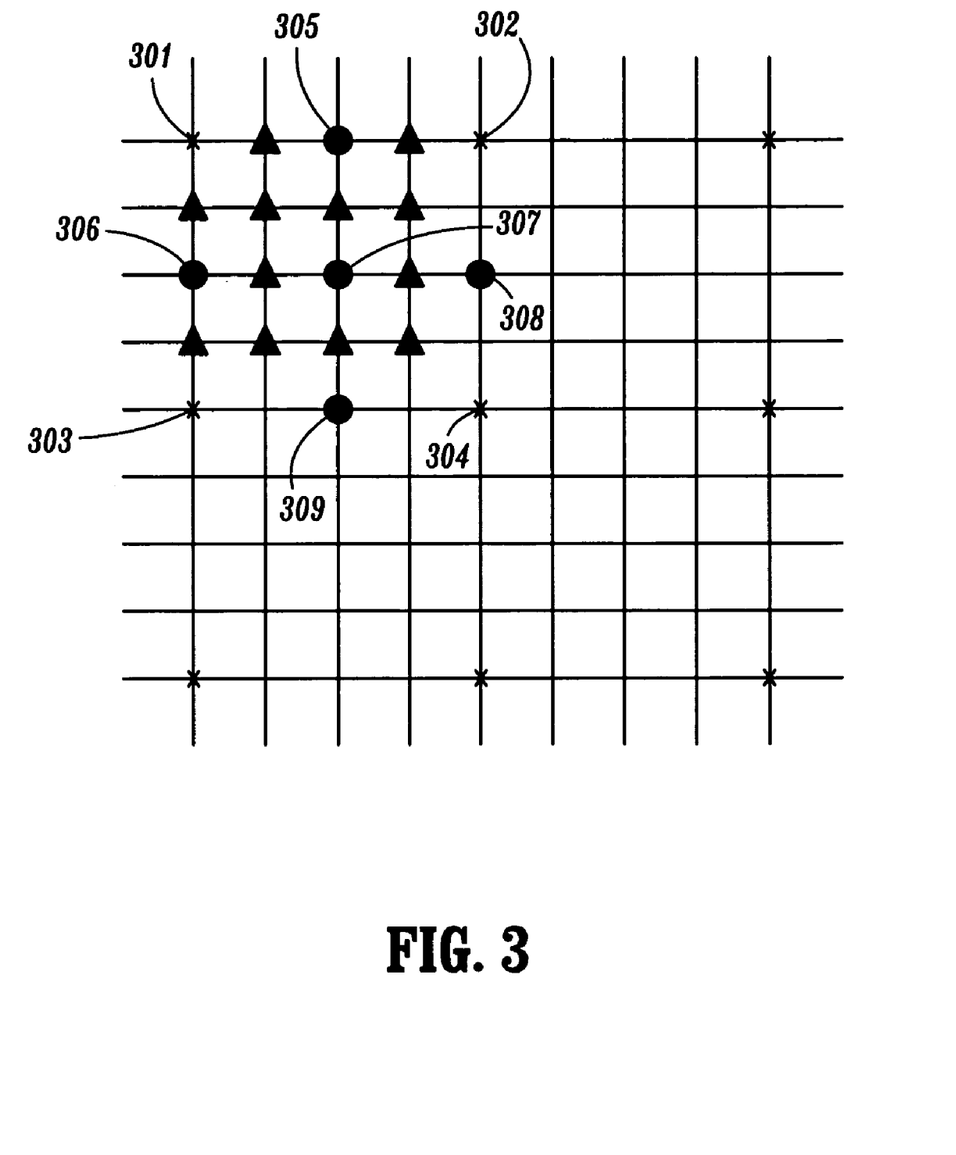
FIG. 3 is a graph of an adaptive refinement scheme according to an embodiment of the present disclosure.

Assume ray casting in the image space from left to right and from top to bottom. Any neighboring ray therefore is either left to this ray or above this ray (similarly, use right/below ray as the neighboring ray). Since the location information of the neighboring ray is already updated and saved in the maxMipLoc buffer, it can be used to determine a few samples around the same location. The maximum of the samples then is used as the initial threshold.

if an adaptive progressive refinement render scheme is used as described in M. Levoy. "Volume Rendering by Adaptive Refinement", The Visual Computer, 6(1), 1990, 2-7, the spatial coherence information that is obtained from the previous rendering stage can be implemented for the current stage. In FIG. 3 an example of such an approach is shown. Let's assume that the four pixels marked as crosses (301-304) are cast in the first stage and the five pixels marked by the rounded dots (305-309) are cast in the second stage. The location information obtained from the previous state (e.g., first stage with 4 crosses) can be used to estimate the sampling location for the initial thresholds of the pixels indicated by the rounded dots. The position at any round dot can be estimated by using an interpolation method such as nearest neighbor, bi-linear interpolation or any other 2D interpolation kernels. Similarly, the previous obtained location information (both crosses and rounded dots) and an interpolation scheme can be used to estimate the position to sample for the initial thresholds of the pixels marked by the triangles in the third rending stage.

Combining both the temporal and spatial coherence, the location values are determined and saved in the maxMipLoc buffer. The location value at the same ray position is the temporal coherence information from the previous frame and the location value from the neighboring ray cast before this ray is the spatial coherence information. The ray around these positions is sampled (interpolated). The resulting samples are compared against each other (e.g., comparing maximum/minimum temporal coherence and the larger one is used as the initial threshold for the second pass.

Figure 7:
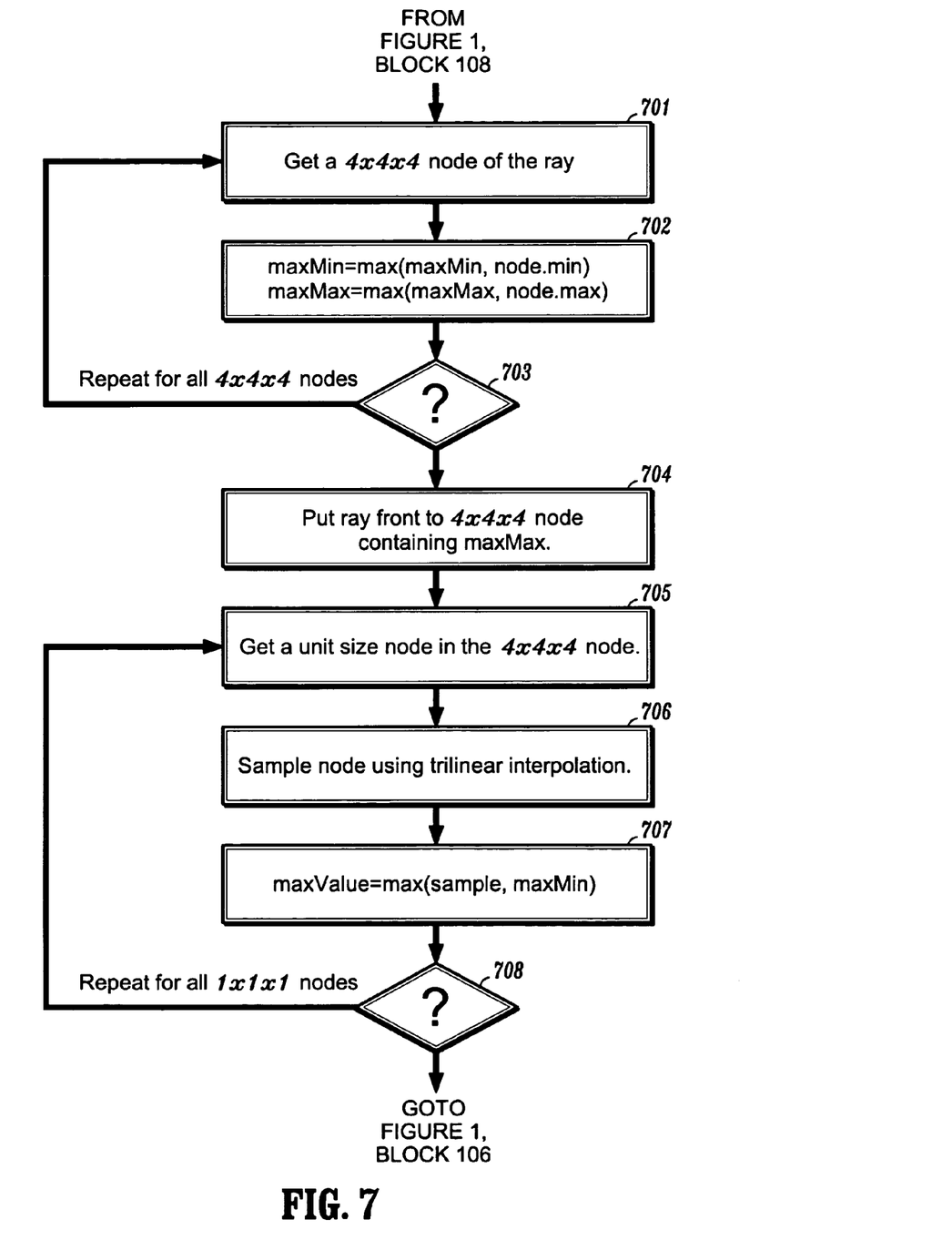
FIG. 7 is a flow chart of a method for a first pass upon determining an exception according to an embodiment of the present disclosure.

There are a few exceptions or boundary conditions to above procedure where an alternative first search scheme described in "System and Method for Fast Generation of High-Quality Maximum/Minimum Intensity Projections" is needed. Referring to FIG. 7 an alternative first pass method for a MIP is described. The exemplary alternative first pass depicted in FIG. 7 uses a first level comprising 4%4%4 nodes. This first pass starts, at block 701, at the first node along the ray, and uses the minimum and maximum values stored for each node. At block 702, the maximum of each node minimum value and the maximum of each node maximum values is determined. At block 703, the next node along the ray is visited, so that all nodes along the path of each ray are traversed. If the raycast sampling step size is of unit step size, the step size for this first pass is four. The maximum node minimum value and he maximum node maximum value are referred to herein as maxMin and maxMax, respectively. Then, at block 704, the ray front is places at the 4%4%4 node whose maximum value is maxMax, and this node is sampled with a unit step size. The first unit size node in the 4%4%4 node is obtained at block 705, and trilinear interpolation is used at block 706 to determine the sample value for this. A maximum of the node sample is determined at block 707. If the sample is greater than maxMin, the sample is saved as a maximum value, otherwise the maximum value is taker to be maxMin. This maximum value is referred to as maxValue and can be used as the initial threshold for the second pass. At block 708, the ray front is incremented by one to obtain the next node along the ray, and the preceding steps are repeated until all nodes along the ray have been visited. The first pass can be performed quickly since the step size is four in the 4%4%4 sub-volume case and only 4 trilinear interpolations are performed for each ray.

If a MinIP is being performed, the first stage would determine a minimum of each node maximum, and a minimum of each node minimum, denoted herein by minMax and minMin, respectively. For the second stage, the ray front would be placed at the 4%4%4 node whose minimum value is minMin, and the minimum value would be compared to minMax, and would be saved if less than minMax. This minimum value, denoted herein by minVal, would serve as the threshold for the next pass.

Exceptions 108 are determined and summarized as follows:

When the first frame is rendered, no temporal coherence information is available and the maxMipLoc buffer is initialized to −1. For the first ray cast, spatial coherence information is not available. Therefore a first pass is needed to determine the initial threshold.

All the rays are clipped against the volume boundary during the ray front setup period. The method does not shoot the ray if it is outside of the volume boundary. When both the immediate neighbor of the current ray the the current ray of the previous frame is outside of the volume boundary and therefore the temporal and spatial coherence information is not available, the first pass is needed to determine the threshold.

When the interpolated results at the location for the previous frame and neighboring ray are substantially smaller than the maximum values of the neighboring ray and of the ray from the previous frame, it may not represent the optimal threshold. In this case, the first pass is searched to find the threshold and compare to these values to fine the maximum to use as a threshold for the second path.

Combining the temporal and spatial coherence with the two pass searching method, a simplified and improved first search pass is determined for the rays. The method can reduce both the first path searching overhead and reduce the interpolation ration (contributed by better threshold), therefore, to achieve better performance without any compromise in image quality.

An embodiment of the method has been tested with three datasets: a 512×512×512 CT head dataset; a 512×512×500 CT lung dataset and a 512×512×1892 CT runoff dataset. The tests were conducted on a dual Xeon 3.06 Ghz Dell Precision 450 workstation with 2 GB of main memory. All the number given in table 1 are the results of averaging 10 viewing angles differed by 5 degrees each. We can see that the coherence based method gives us a speed of up to 10-20% compared to the original two-pass method. The interpolation samples out of the total number of samples for all the rays. We can see that the interpolation ratios for all three datasets were improved (reduced) which results from better initial threshold found with the coherence based method compared to the original methods. Experiments also show that the time spent for first pass searching can be reduced from 30% to about 5-10% of the total time.

TABLE 1

| DATA-SET | TWO-PASS TIME (ms) | TWO-PASS INTERPOLATION RATIO (%) | CO-HERENCE TIME (ms) | CO-HERENCE INTERPOLATION RATIO (%) | SPEED INCREASE |
|---|---|---|---|---|---|
| CT HEAD | 359.8 | 5.26 | 286.4 | 4.42 | 20.4% |
| CT LUNG | 811.6 | 12.7 | 731.8 | 12.5 | 9.83% |
| CT RUNOFF | 1464.2 | 4.54 | 1216.2 | 3.42 | 16.9% |

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 2:
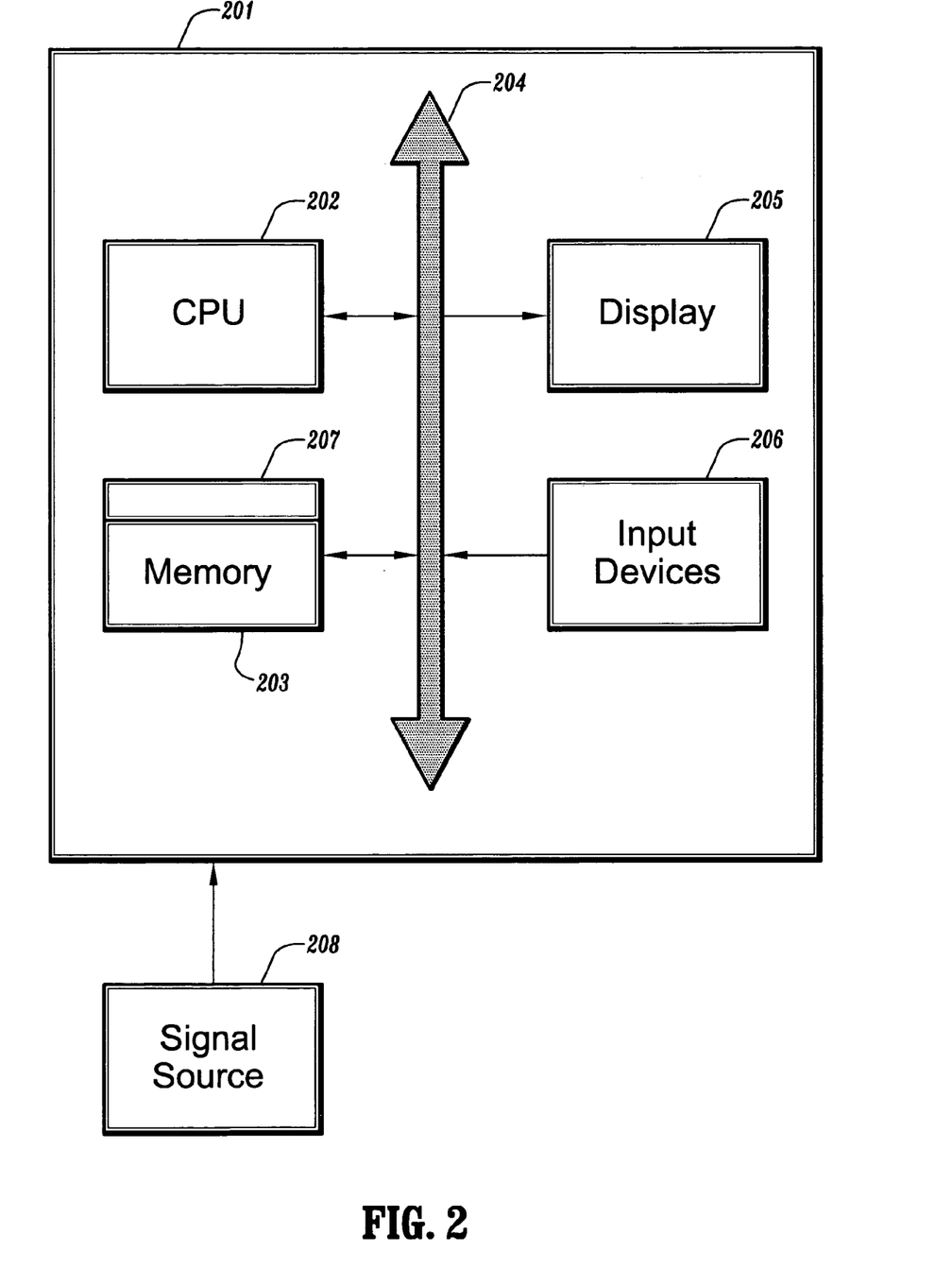
FIG. 2 is a diagram of a system according to an embodiment of the present disclosure.

Referring to FIG. 2, according to an embodiment of the present disclosure, a computer system 201 for implementing a method for extracting peak information, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The display 205 can display view of the virtual volume and registered images. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routing 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for maximum/minimum intensity projection, it is noted that modifications and variations can be made by persons skilled in the art in light of the above teachings. It is therefore to be understood that changes may be made in the particular embodiments of the inventions disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for intensity projection comprising:
   providing volume data;
   creating a buffer;
   storing in the buffer, for each ray of a previous frame, a first distance from a pixel to a maximum/minimum intensity value along a corresponding ray;
   storing in the buffer, for each ray of the previous frame, the maximum/minimum intensity values;
   casting a new ray in a following frame from the pixel, the ray having a first location retrieved from the buffer, wherein the first location is determined according to the first distance;
   determining, for the pixel, an estimated maximum/minimum intensity of at least one sample around the first location as an initial threshold for a second pass;
   performing the second pass for determining an actual maximum/minimum value along the new ray; and updating the buffer with a new location value where the actual maximum/minimum value for the next frame was determined.

2. The computer-implemented method of claim 1, wherein the actual maximum/minimum value of the node is compared to the initial threshold for each octree node that the new ray passes through, wherein if the actual maximum/minimum intensity value is less/greater than the initial threshold, the octree node is skipped and no voxels in the octree node are sampled.

3. The computer-implemented method of claim 1, further comprising:
 determining an exception prior to the second pass; and
 visiting each first level node along the ray to find an maximum/minimum value, and visiting each point in a first level node containing the maximum/minimum value to find a bounding value, wherein the threshold is the bounding value.

4. The computer-implemented method of claim 1, further comprising:
 storing in the buffer,
 for each ray of a current frame, a second distance from a pixel to a maximum/minimum intensity value along a corresponding ray;
 storing in the buffer, for each ray of the current frame, the maximum/minimum intensity values;
 casting a new ray from a neighboring pixel, the pixel having a second location retrieved from the buffer, wherein the second location is determined according to the second distance; and
 determining, for the pixel, the estimated maximum/minimum intensity value of the at least one sample along the ray as the initial threshold for the second pass,
 wherein the maximum/minimum intensity is selected from the first location and the second location.

5. The computer-implemented method of claim 4, wherein the actual maximum/minimum value of the node is compared to the initial threshold for each octree node that the new ray passes through, wherein if the actual maximum/minimum intensity value is less/greater than the initial threshold, the octree node is skipped and no voxels in the octree node are sampled.

6. The computer-implemented method of claim 4, further comprising:
 determining an exception prior to the second pass; and
 visiting each first level node along the ray to find an maximum/minimum value, and visiting each point in a first level node containing the maximum/minimum value to find a bounding value, wherein the threshold is the bounding value.

7. The computer-implemented method of claim 4, further comprising obtaining spatial coherence information the neighboring pixel that is obtained from the previous rendering stage can be implemented for the current stage.

8. A computer-implemented method casting a ray through an image comprising:
 providing a reduced path octree structure of a volumetric image, said reduced path octree comprising a plurality of first level nodes, wherein each first level node contains a plurality of intensities, wherein each node includes a minimum intensity value and a maximum intensity value;
 defining a position determined as a maximum/minimum along a ray in a previous frame as an estimated threshold for a current frame; and
 visiting each first level node along the ray, wherein a maximum/minimum intensity value for the first level nodes is selected by the threshold, sampling each intensity within each first level node, and saving a maximum/minimum value of each said sample.

9. The computer-implemented method of claim 8, wherein said volumetric image is a digitized image comprising a plurality of intensities corresponding to a domain of points in a 3-dimensional space.

10. The computer-implemented method of claim 8, wherein said ray was cast from a point in a 2-dimensional array, and further comprising storing said saved maximum/minimum value of each sample with the point from which said ray was cast.

11. A computer-implemented method casting a ray through an image comprising:
 providing a reduced path octree structure of a volumetric image, said reduced path octree comprising a plurality of first level nodes, wherein each first level node contains a plurality of intensities, wherein each node includes a minimum intensity value and a maximum intensity value;
 defining a position determined as a maximum/minimum along a neighboring ray as an estimated threshold for a current frame; and
 visiting each first level node along the ray, wherein a maximum/minimum intensity value for the first level nodes is selected by the threshold, sampling each intensity within each first level node, and saving a maximum/minimum value of each said sample.

12. The computer-implemented method of claim 11, wherein said volumetric image is a digitized image comprising a plurality of intensities corresponding to a domain of points in a 3-dimensional space.

13. The computer-implemented method of claim 11, wherein said ray was cast from a point in a 2-dimensional array, and further comprising storing said saved maximum/minimum value of each sample with the point from which said ray was cast.

14. A computer-implemented method for intensity projection comprising:
 providing volume data;
 determining an estimated threshold for determining a maximum/minimum intensity value in the volume data from temporal coherence and spatial coherence information;
 performing the second pass for determining an actual maximum/minimum value along the new ray, wherein the second pass uses the estimated threshold as an initial threshold; and
 updating the buffer with a new location value where the actual maximum/minimum value for the next frame was determined.

* * * * *